I. A. CARY.
PEDAL GRIP.
APPLICATION FILED NOV. 3, 1910.
1,001,504.
Patented Aug. 22, 1911.
Fig. 1.
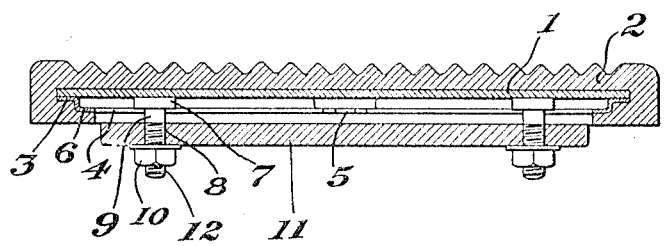
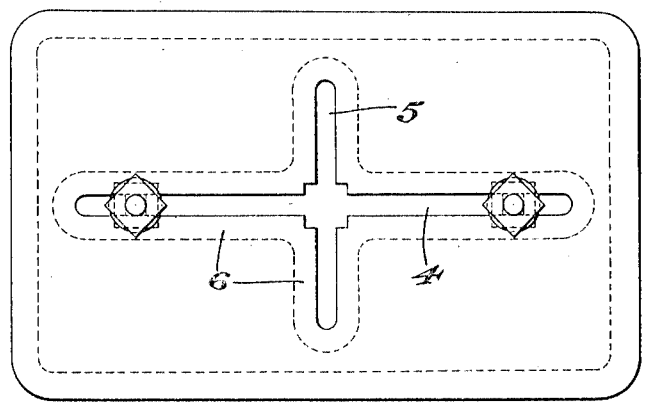
Fig. 2.
Witnesses:
Hugo Mock
B. Roman.
Isaac A. Cary, Inventor
By his Attorneys

UNITED STATES PATENT OFFICE.

ISAAC A. CARY, OF BROOKLYN, NEW YORK, ASSIGNOR TO AMERICAN PEDAL CO., OF NEW YORK, N. Y., A CORPORATION OF NEW YORK.

PEDAL-GRIP.

1,001,504. Specification of Letters Patent. Patented Aug. 22, 1911.

Application filed November 3, 1910. Serial No. 590,495.

*To all whom it may concern:*

Be it known that I, ISAAC A. CARY, a citizen of the United States, residing at Brooklyn, in the county of Kings and State of New York, have invented certain new and useful Improvements in Pedal-Grips; and I do hereby declare the following to be a full, clear, and exact description of the invention, such as will enable others skilled in the art to which it appertains to make and use the same.

This invention relates to pedals and particularly to pedal grips as are ordinarily used on automobiles.

The object of my invention is to provide an improved pedal grip or plate to be attached on top of the regular iron pedal so as to afford a firm contact between the operator's foot and the surface of the pedal and thereby prevent slipping, which is the cause of many accidents, the pedal grip being reliable, simple and inexpensive.

Another object of my invention is to provide bolts on the pedal grip, that are adjustable longitudinally and transversely along the center lines of the pedal grip, so that the same may be attached to a pedal of any dimensions that the automobile may happen to be equipped with.

My invention consists of the combinations and features hereinafter fully described and claimed.

In the accompanying drawings, Figure 1 is a longitudinal section of the pedal grip and Fig. 2 is a plan of the underside of the pedal grip.

Similar reference characters refer to similar parts in the different views of the drawing.

In this pedal grip a metal plate 1 is cast within the thick rubber sheet 2 which serves as the tread and essentially forms the pedal grip itself. Adjacent to the plate 1 is fastened another plate 3 which is provided with slots 4 and 5 extending along its center lines, longitudinally and transversely. Surrounding the slots 4 and 5, the plate 3 is bulged out as at 6 to form a retaining means for the bolt-head 7 of the bolts 8. The part of the bolt 9 near the bend is made square, so that the bolts are guided along the slots and are kept from rotating when the nuts 10 are being tightened.

To attach the pedal grip to any pedal it is only necessary to drill two holes in the pedal 11 Fig. 1 and then insert the threaded part 12 of bolts 8, when the nuts 10 may be tightened with a wrench in the ordinary manner and the pedal grip thus firmly secured in place. It will be evident that the bolts 8 may be adjusted anywhere along the longitudinal slot 4 so that the distance between them may be fixed as desired, and that the bolts may if preferred be caused to engage the edges of transverse slot 5. This makes it possible to attach the pedal grip to a pedal of any dimensions, for however narrow the pedal might be, two holes may be drilled therein and the bolts 8 shifted along the slots 4 or 5 to adjust to those holes and the pedal grip fastened as described, the plate 1 serving as a reinforcement for the pedal grip if the pedal to which it is attached should be too narrow. It will be therefore seen that the objects and advantages of my invention are fully met, and it must be understood that my invention is not to be limited to the specific form of construction and arrangement as shown and described here, but that variations may be made in practice without however departing from the spirit of my invention.

Having thus described my invention, I claim:—

1. A pedal grip comprising a frame portion composed of two members spaced apart, one of the members having slots formed therein intersecting near the center and providing an opening at the point of junction of the slots, such opening being enlarged to permit of the passage of a bolt head, and a friction sheet mounted upon the members opposite the slots.

2. A pedal grip comprising a roughened friction sheet, a plate spaced therefrom to afford guide ways for the passage of bolt-heads, said sheet having slots therein arranged to intersect, the opening at the intersection of the slots being enlarged to permit of the entrance of bolt heads.

In testimony whereof I affix my signature in presence of two witnesses.

ISAAC A. CARY.

Witnesses:
 HENRY C. CORNWELL, Jr.,
 HUGO MOCK.

Copies of this patent may be obtained for five cents each, by addressing the "Commissioner of Patents, Washington, D. C."